Sept. 15, 1925.
L. D. PENDER
FERTILIZER DISTRIBUTOR
Filed Aug. 5, 1924
1,553,715
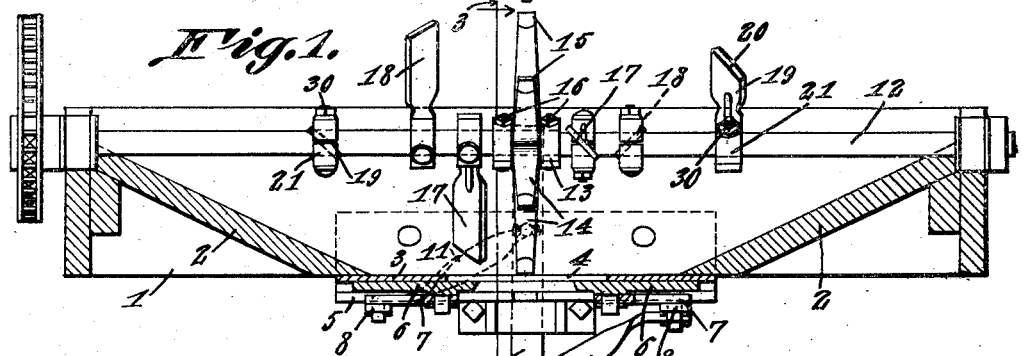
Inventor
L. D. Pender,
By C. A. Snow & Co.
Attorneys Patented Sept. 15, 1925.

1,553,715

UNITED STATES PATENT OFFICE.

LORENZO DOW PENDER, OF TARBORO, NORTH CAROLINA.

FERTILIZER DISTRIBUTOR.

Application filed August 5, 1924. Serial No. 730,264.

*To all whom it may concern:*

Be it known that I, LORENZO DOW PENDER, a citizen of the United States, residing at Tarboro, in the county of Edgecombe and State of North Carolina, have invented a new and useful Fertilizer Distributor, of which the following is a specification.

It is essential, in the correct operation of a fertilizer distributor, that the outlet opening of the hopper be maintained at all times fixed relative to the center of the hopper and for the purpose of properly delivering the fertilizer to this opening and expelling it therefrom it is necessary to have some efficient means for not only agitating and breaking up the fertilizer but also for shifting it from opposite ends of the hopper toward the opening and then expelling it through the opening. It is an object of the present invention to provide simple and efficient mechanism for this purpose, said mechanism being made up of parts that are easily assembled.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a vertical longitudinal section through the hopper of a fertilizer distributor embodying the present improvements, said section being on the line 1—1, Fig. 2.

Fig. 2 is a bottom plan view of the hopper.

Fig. 3 is a section on line 3—3, Fig. 1.

Fig. 4 is a section through the shaft showing one of the hub sections of a blade partly in section and partly in elevation.

Fig. 5 is a similar view showing the other hub section.

Referring to the figures by characters of reference, 1 designates an elongated hopper the bottoms of the end portions of which are inclined downwardly toward the central portion of the hopper, as shown at 2. A plate 3 is secured to the bottom of the hopper and extends under the portions 2, this plate being provided with an outlet opening 4. For the purpose of controlling the passage of fertilizer through the opening 4 opposed guides 5 may be provided on the bottom of plate 3 for supporting oppositely disposed cut-off slides 6. To each of these slides is connected a link 7 and the two links are connected to levers 8 fulcrumed on the plate 3. An operating lever 9 is supported back of the hopper and is fulcrumed as at 10, this lever being provided with links 11 pivotally connected thereto at opposite sides of the fulcrum 10 and pivotally connected to the respective levers 8. Thus it will be seen that when lever 9 is swung to the right or to the left the plates 6 will be moved toward or from each other to vary the size of the passage through which the fertilizer can escape.

Extending longitudinally of the hopper 1 is a shaft 12 adapted to be driven in any suitable manner and mounted on this shaft directly above the center of the opening 4 is an ejecting wheel comprising a split hub 13 and radial fingers 14. The outer ends of the fingers are flattened as indicated at 15 and are adapted to work close to the opening 4 so that any material directed into position above the opening and in the path of the fingers will be pressed downwardly by the paddle-like ends of the fingers and forced through the opening 4. Bolts 16 are extended through the hub sections and also through the shaft 12 and serve to clamp these sections together and to fasten them upon the shaft.

Located on the shaft at opposite sides of the ejecting wheel is a group of mixing and deflecting blades indicated at 17, 18 and 19. Each of these blades is obliquely disposed relative to the axis of the shaft 12. The blades 17 and 18 of each group are preferably extended in opposite directions, the pitch being such that when the shaft is rotated in one direction both blades will operate not only to thoroughly break and mix the contents of the hopper 1 but also to deflect them toward the ejecting wheel. Another blade 19 which is mounted between the blade 19 and the end of the shaft is also pitched so as to deflect the agitated material toward the ejecting wheel, and this blade has its free end cut off obliquely as shown at 20 so that it can work close to the inclined end portion 2 of the bottom of the hopper.

All of the blades 17, 18 and 19 are provided with split hubs 21. The hubs are of the same construction and one of them has been illustrated in Figs. 4 and 5. One section of the hub is arcuate as indicated at 22 so as to straddle the shaft 12 and a recess 23 is provided in one end of this section while a lug 24 extends from the other end thereof. The mixing blade extends from one end of this section 22. The other section 25 is also arcuate so as to straddle shaft 12 and has a recess 26 in one end and a lug 27 on its other end. Openings 28 are extended through the centers of the hub sections and are adapted to register with an opening 29 extending through the shaft. Thus a bolt 30 extended through the registering openings will bind the parts together securely and cause the studs 24 and 27 to be seated in the recesses 23 and 26 respectively. The hub sections of the ejecting wheel can be similarly constructed, it being understood of course that some of the fingers of the wheel are extended radially from each of the hub sections. The blades as illustrated are of uniform width; it having been found essential, in practice, to provide such a construction as otherwise the fertilizer will not be fed smoothly and steadily in the manner desired.

The number of blades used for deflecting material laterally within the hopper is equal to the number of ejecting fingers 14. These deflecting blades are spaced apart longitudinally of the shaft 12 and are also spaced apart angularly about the shaft. Each blade is positioned at one side of the space between two adjoining fingers 14 and, consequently the lateral deflecting action of each blade tends to force a portion of the contents of the hopper laterally into position directly into the path of one of the fingers. By arranging the blades as mentioned material is forced in this way into the path of each finger so that after one ejecting finger has thrust through the opening 4 a part of or all of the material in the path thereof, the next finger will act upon another supply of material directed into the path thereof by its deflecting blade and force this second quantity of material through the opening. Consequently the flow of material through the opening is continuous, each ejecting finger 14 receiving a supply of material from its particular deflecting blade. It will be noted that no two of the blades are directed opposite each other. Consequently should the opening 4 be partly closed or entirely closed, surplus material deflected laterally by each blade will pass over the opening and between the ejecting fingers and into the path of one of the deflecting blades at the opposite side of the fingers. This other deflecting blade will engage the material and thrust it back toward the other end of the hopper. This shuttle-like motion of the surplus material will continue as long as the opening 4 is too small to permit delivery of all of the material shifted or deflected by the blades. The paddle-like ends of the fingers 14 insure positive ejection of material brought into the paths of the fingers and as the deflecting blades are of uniform width practically throughout their length, they operate to shift or deflect material throughout the entire length of the blade, thus insuring the delivery of all material necessary when the outlet 4 is opened to its greatest extent.

What is claimed is:—

In a fertilizer distributor the combination with a hopper having an outlet and means for varying the size of the outlet, of a shaft mounted within the hopper, a series of radial ejecting fingers regularly spaced about and rotatable with the shaft above the outlet, a series of deflecting blades upon the shaft at each side of the series of ejecting fingers, said deflecting blades of the two series being disposed at one side of the respective spaces between the ejecting fingers, the deflecting blades on the same side of the outlet being out of alinement and movable in different paths respectively, the deflecting blades of the two series constituting means for setting up a back and forth movement of surplus material across the outlet and between the ejecting fingers, each deflecting blade being of substantially uniform width throughout its length.

In testimony that I claim the foregoing as my own I have hereto affixed my signature.

LORENZO DOW PENDER.